UNITED STATES PATENT OFFICE.

FREDERICK A. STALL, OF BOSTON, MASSACHUSETTS.

IMPROVEMENT IN COMPOUNDS FOR PAINTS.

Specification forming part of Letters Patent No. 141,897, dated August 19, 1873; application filed August 4, 1873.

*To all whom it may concern:*

Be it known that I, FREDERICK A. STALL, of Boston, in the county of Suffolk and State of Massachusetts, have invented Improvements in Paints, of which the following is a specification:

This invention relates to the manufacture of a fire-proof paint, to be used not only upon the outside of buildings and other structures wherever paint is essential to the preservation and protection of wood, and any substance requiring or being benefited by paint, but also upon the interior of buildings; and it consists of a composition or compositions formed by mixing the following ingredients in substantially the proportions herein set forth.

To prepare the paint for use upon the outside of buildings, &c., as above mentioned, take the following ingredients, and in these proportions, viz: To one barrel of coal-tar add twelve pounds of asphaltum, six pounds of the silicate of soda, two gallons of dead-oil, four quarts of ground slate or its equivalent, one-half pound of plumbago, two pounds of gum dammar or its equivalent, four quarts of lime, four quarts of coal-ashes, and two gallons of rosin-oil. To this mixture coloring pigments may be added, though not essential for most purposes. The color of the said mixture is dark slate. For a less or greater quantity the same proportions may be used.

I do not confine myself to these exact ingredients or these certain proportions, but have found these proportions form the best compound. For instance, I may use the silicate of potassa in the place of the silicate of soda, and burned clay for ground slate, and wood-ashes for coal-ashes, with substantially the same results.

The mixture, as above stated, in quantity will consist of about forty gallons. These ingredients are put into a kettle and slowly heated, the mass being stirred in the meanwhile. The paint is laid on in the ordinary way, and when properly laid on is as nearly fire-proof, absolutely, as any substance can be, and is extremely durable. The paint is entirely inodorous, the tar odor having been removed by certain ingredients in the composition. A good coat of this paint upon any substance suitable for paint will resist any ordinary fire upon it, and it also possesses great durability.

For a fine white or colored fire-proof paint, to be used upon the interior of buildings and other structures or devices, I vary the ingredients of the mixture, as follows, viz., for a small quantity, and the same proportions in larger quantities: To one-half pound of white lead add a tea-spoonful of burned umber, one gill of linseed-oil, one tea-spoonful of Japan, one tea-spoonful of shellac dissolved in alcohol, one tea-spoonful of the spirits of turpentine, and about a wine-glass of the silicate of soda or silicate of potassa. This mixture, properly treated, with or without coloring pigments, will form a fire-proof paint of great durability.

In the above compounds for paint I do not explain the chemical action of each constituent. To those skilled in the art the action of those ingredients will be readily understood. Experiment, however, has shown the great value of the same, and as possessing the qualities of fire-proof, durability, and freedom from odors.

I claim—

The improved paints, prepared in the manner and of the materials substantially as described.

FREDERICK A. STALL.

Witnesses:
 J. L. NEWTON,
 TIMOTHY DAVIS.